US006042895A

United States Patent [19]

Huang

[11] Patent Number: 6,042,895

[45] Date of Patent: Mar. 28, 2000

[54] METHOD FOR IMPRINTING WOODPRINTS ONTO BLADE OF FAN

[76] Inventor: Yu-Keng Huang, Taipei, Taiwan

[21] Appl. No.: 08/982,370

[22] Filed: Dec. 2, 1997

[51] Int. Cl.[7] .................... C08J 7/04

[52] U.S. Cl. .................... 427/510; 427/258; 427/356; 427/368; 427/383.5; 427/412.1; 427/558; 427/559; 427/595

[58] Field of Search .................... 427/510, 514, 427/558, 559, 595, 258, 368, 393.5, 412.1, 356

*Primary Examiner*—Bernard Pianalto
*Attorney, Agent, or Firm*—Smith, Gambrell & Russell

[57] ABSTRACT

A method for imprinting woodprints onto the blade of fan generally includes the steps of 1) molding the plastic blade; 2) coloring the blade with woodprints; and 3) deploying a protective coating thereof. Characterized in that when the plastic blade is molded by injected molding, the surface of the plastic blade is formed with a plurality of recesses that stimulate the annular rings. The plastic material can be dyed with white or other colors that stimulates the wood color. Then the surface of the plastic blade is printed with a first UV coating that is darker than the color of plastic blade. Afterward, the UV coating is then flattened by means of a rubber knife such that the UV coating is left only within the recesses on the surface of the plastic blade. Before the UV coating is cured and dried, a brush can be used to brush the UV coating longitudinally to generate a pattern of fibrils. Then the coating is undergone the UV light to cure and dry the UV coating. Afterward, a second UV coating is deployed onto the surface by means of brush. Finally, the second UV coating is cured and dried by means of UV light and an UV protective film is coated onto the UV coating and then dried. The plastic blade having genuine woodprints is attained.

7 Claims, 2 Drawing Sheets

METHOD FOR IMPRINTING WOODPRINTS ONTO BLADE OF FAN

FIELD OF THE INVENTION

The present invention relates to a method for imprinting the woodprints onto the blade that is made through injecting molded or press-casting processes. The surface of the blade can be imprinted with a selected woodprint. The plastic blade is formed with recesses that simulates the annular rings of tree. Then those recesses are then coated with selected colors thereon and then are combed by brush along the directions of the recesses. By this arrangement, the plastic blade can be provided with woodprints that have a genuine visual effect of real woodprints. The quality of the blade can be therefore increased.

DESCRIPTION OF PRIOR ART

The blades of the fan that are suspended from the ceiling are made from real wood and plastic materials respectively.

As the woods have been over-used, and the cutting of woods has brought damage to the environment. Wood has not been used for sometime. On the other hand, the wooden blade has a thicker body and cutting edge, it has a larger wind resistance and is heavy. Besides, it is quite heavy and tends to deform and crack. This is really not practical for actual use.

However, the plastic blade is short of naturally aesthetic appearance. It seems to have less quality and value. This plastic blade can not meet the requirements of the indoor decoration. In order to provide a valuable appearance to the plastic blade, the surface of the plastic blade is imprinted with woodprints through lithography or transfer printing. Even this overall appearance of the plastic blade has been upgraded a little bit, the imprinted woodprints are too smooth to stimulate the real woodprints. The overall woodprints are short of genuine and substantial appearance of the real annual rings of a tree. Accordingly, the value and quality of the plastic blade having woodprints are still required to upgraded.

SUMMARY OF THE INVENTION

It is the objective of this invention to provide an improved imprinting method with which genuine woodprints can be readily formed onto the surface of the plastic blade.

It is still the objective of this invention to provide an improved imprinting method wherein the plastic blade can be imprinted with woodprints that look like real woodprints. By this arrangement, the aesthetic appearance and value of the plastic blade can be upgraded. As a result, the plastic blade that is imprinted with woodprints can be readily used to replace the wooden blade. As a result, the wood resource can be preserved and the used plastic blade can be recycled. This product is really environment friendly.

It is still the objective of this invention to provide a method for imprinting the woodprints onto the plastic blade that is light and thin. The wind resistance can be therefore reduced.

In order to achieve the objective set forth, the method provided according to the present invention generally includes the steps of 1) molding the plastic blade; 2) coloring the plastic blade with woodprints; and 3) deploying a protective coating thereof. When the plastic blade is molded by injected molding, the surface of the plastic blade is formed with a plurality of recesses that simulate the annular rings. The material can be selected from polystyrene, styrene, proplene or the likes. The plastic material can be dyed with white or other colors that simulate the wood color. Then the surface of the plastic blade is printed with a first UV coating that is darker than the color of the plastic blade. For example, a dark brown can be printed thereon. Afterward, the UV coating is then flattened by means of a rubber knife such that the UV coating is left only within the recesses on the surface of the plastic blade. Before the UV coating is cured and dried, a brush can be used to brush the UV coating longitudinally to generate a woodgrain pattern, similar to fibrils. Then the coating is treated with UV light to cure and dry the UV coating. Afterward, a second UV coating is deployed onto the surface by means of brush. Finally, the second UV coating is cured and dried by means of UV light. Finally an UV protective film is coated onto the UV coating and then dried. The plastic blade having genuine woodprints is attained.

The plastic blade made with the method described can be provided with woodprints that simulate the genuine and substantial rings of trees. This really brings an aesthetic appearance to the plastic blade as it looks like a real wooden blade. By this arrangement, the value of the wooden blade can be upgraded and the woods resource can be preserved.

BRIEF DESCRIPTION OF DRAWINGS

In order that the present invention may more readily be understood the following description is given, merely by way of example with reference to the accompanying drawings, in which.

DETAILED DESCRIPTION OF THE PREFERRED EMBODIMENTS

Figure 1:
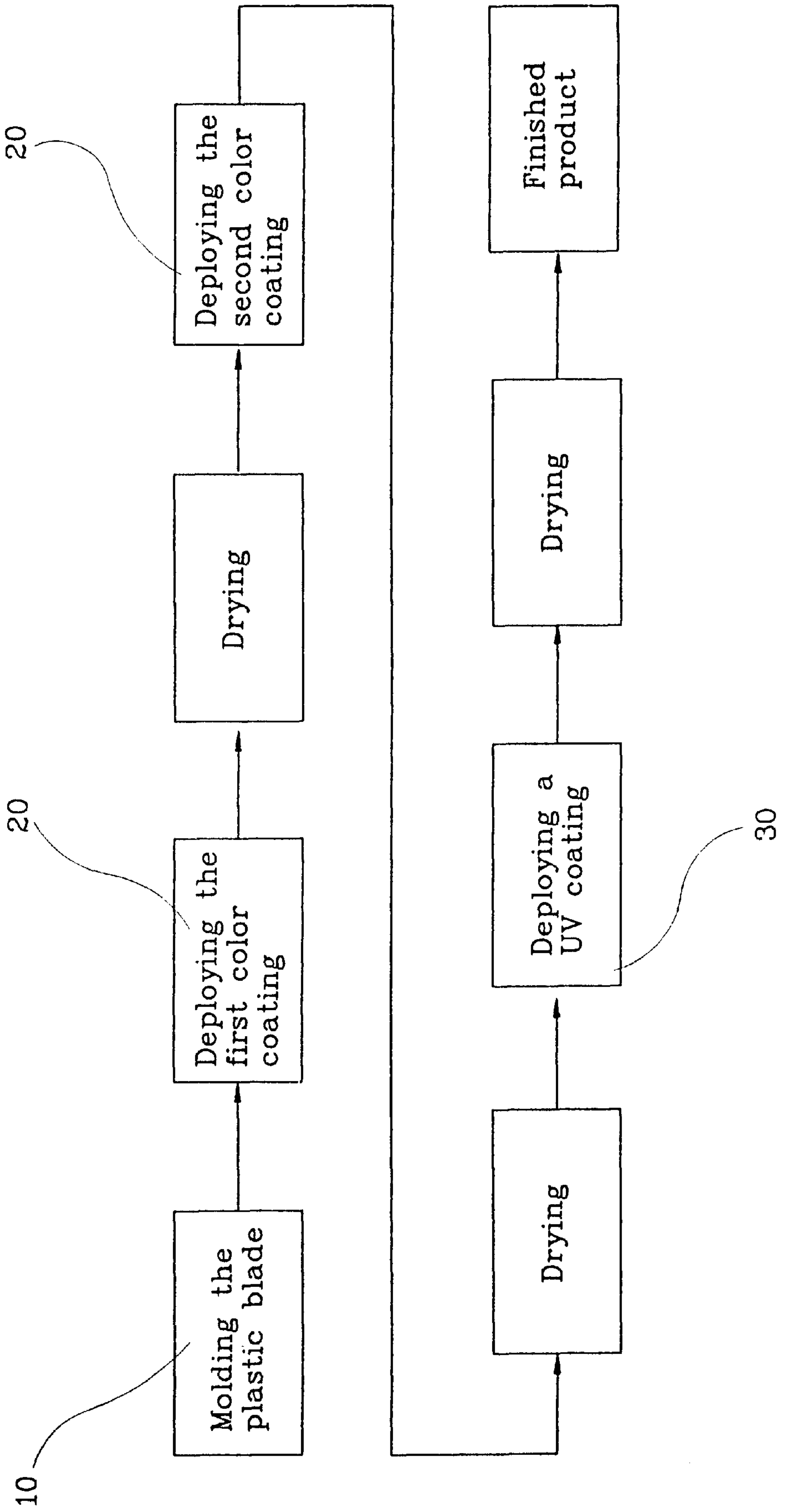
FIG. 1 is a flow chart of the manufacturing processes for the present invention.
Figure 2:
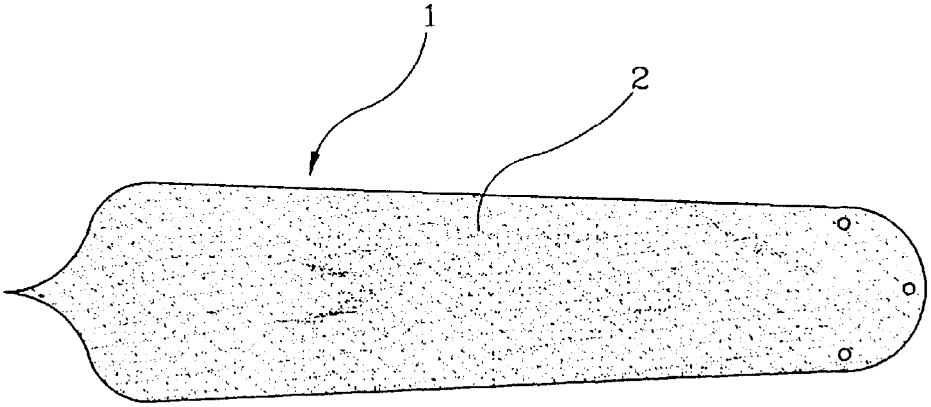
FIG. 2 is an enlarged view of the plastic blade made according to the present invention.
Figure 3:
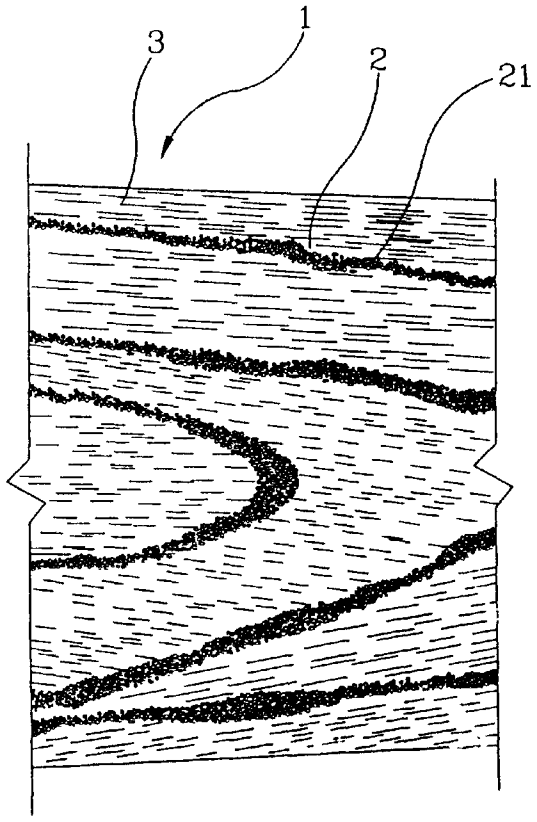
FIG. 3 is an enlarged view of the plastic blade shown in FIG. 2.

Referring to FIGS. 1 to 3, the method provided according to the present invention generally includes the steps of 1) the first step 10 of molding the plastic blade; 2) the second step 20 of coloring the plastic blade with woodprints; and 3) the third step 30 of deploying a protective coating thereon. When the plastic blade is molded by injected molding, the surface of the plastic blade is formed with a plurality of recesses 21 that simulate the annular rings 2, as shown in FIG. 2, the color of the blade 1 is white. On the other hand, the color of the blade 1 can be also sprayed with a desired color that is similar to wood. The material for molding the plastic blade can be selected from polystyrene, styrene, propylene or the like. On the other hand, the plastic material can be also dyed with white or other colors that simulates the wood color.

Then the surface of the plastic blade 1 is printed with a first UV coating that is darker than the color of the plastic blade. For example, a dark brown can be printed thereon. Afterward, the UV coating is then flattened by means of a rubber knife such that the UV coating is left only within the recesses 2 on the surface of the plastic blade 1 and the excess coating can be removed. Before the UV coating is cured and dried, a brush can be used to brush the UV coating longitudinally to generate a woodgrain pattern 3 similar to fibrils, as shown in FIG. 3. Then the coating is exposed to the UV light to cure and dry the UV coating. Afterward, a second UV coating is deployed onto the surface by means of a brush. Finally, the second UV coating is again cured and dried by means of UV light. Finally, an UV protective film is coated onto the UV coating and then dried. The plastic blade having genuine woodprints is attained.

Obviously, the plastic blade made by the method described can be provided with woodprints that simulate genuine and substantial annular rings of a tree as the imprinted woodprints are uneven and have different depth. This really brings an aesthetic appearance to the plastic blade as it looks like a real wooden blade. As it is made from plastic material, the thickness of the blade can be quite thin and the wind resistance is also quite small. The plastic blade is also tough and recycled. By this arrangement, the value of the wooden blade can be upgraded and the woods resource can be preserved.

With the method described above, the plastic blade can be readily imprinted with genuine woodprints that simulate real wood. The economic value is therefore increased. Besides, the exhaustion of the woods resource can also be reduced and our environment can be also preserved.

I claim:

1. A method for imprinting a pattern onto a blade of a fan, comprising the steps of:

applying a coating onto a surface of a blade of a fan, wherein the surface is formed with a plurality of recesses simulating annular rings of a tree, wherein during the applying, the coating is applied into said recesses, said coating being of a color which is darker than a color of the surface of the blade;

brushing said coating on said surface to form a pattern of fibrils on said surface;

curing and drying said coating on said surface;

coating a protective film onto said coated surface; and drying said protective film.

2. The method as defined in claim 1 wherein said extruded blade is of a white or wood simulating color prior to the application of said coating to the surface of the blade.

3. A method for imparting a pattern onto a blade of a fan, comprising the steps of:

applying an ultraviolet light curable coating onto a surface of a blade of a fan, wherein the surface is formed with a plurality of recesses simulating annular rings of a tree, wherein during the applying, the coating is applied into said recesses, said coating being of a darker color than a color of the surface of the blade;

brushing said coating on said surface to form a pattern of fibrils on said surface;

subjecting said coating to ultraviolet light to cure and dry said coating;

coating a protective film onto said coated surface; and drying said protective film.

4. The method as defined in claim 3 wherein said blade is an extruded plastic blade.

5. The method as defined in claim 4 wherein said extruded plastic blade is a styrene, polystyrene or propylene blade.

6. The method as defined in claim 3 wherein said extruded blade is of a white or wood simulating color prior to the application of said coating to the surface of the blade.

7. The method as defined in claim 6 further comprising:

applying a second ultraviolet curable coating to said cured and dried coating on said surface of the blade, and subjecting said second ultraviolet curable coating to ultraviolet light sufficient to cure and dry said second ultralight curable coating.

* * * * *